United States Patent
Choukroun et al.

(10) Patent No.: US 9,262,695 B2
(45) Date of Patent: Feb. 16, 2016

(54) METHOD FOR DETECTING A PREDEFINED SET OF CHARACTERISTIC POINTS OF A FACE

(75) Inventors: Ariel Choukroun, Toulouse (FR); Sylvain Le Gallou, Baziege (FR)

(73) Assignee: FITTINGBOX, Labege (FR)

( * ) Notice: Subject to any disclaimer, the term of this patent is extended or adjusted under 35 U.S.C. 154(b) by 170 days.

(21) Appl. No.: 14/000,666

(22) PCT Filed: Feb. 21, 2012

(86) PCT No.: PCT/EP2012/052958
§ 371 (c)(1),
(2), (4) Date: Sep. 26, 2013

(87) PCT Pub. No.: WO2012/113805
PCT Pub. Date: Aug. 30, 2012

(65) Prior Publication Data
US 2014/0010439 A1    Jan. 9, 2014

(30) Foreign Application Priority Data
Feb. 22, 2011   (FR) ...................... 11 51424

(51) Int. Cl.
*G06K 9/00* (2006.01)
*G06K 9/62* (2006.01)

(52) U.S. Cl.
CPC .......... *G06K 9/6232* (2013.01); *G06K 9/00248* (2013.01)

(58) Field of Classification Search
CPC ................. G06K 9/00248; G06K 9/6232
See application file for complete search history.

(56) References Cited

U.S. PATENT DOCUMENTS

| | | | | |
|---|---|---|---|---|
| 6,671,391 | B1* | 12/2003 | Zhang et al. | 382/118 |
| 2008/0063263 | A1* | 3/2008 | Zhang et al. | 382/159 |
| 2008/0310759 | A1* | 12/2008 | Liu et al. | 382/294 |
| 2009/0208056 | A1* | 8/2009 | Corcoran et al. | 382/103 |
| 2011/0075916 | A1* | 3/2011 | Knothe et al. | 382/154 |

OTHER PUBLICATIONS

Cuiping Zhang et al.: "Component-Based Active Appearance Models for Face Modelling", Jan. 1, 2005, Advances in Biometrics Lecture Notes in Computer Science, LNCS, Springer, Berlin, DE, XP019026877, ISBN: 978-3-540-31111-9, pp. 206-212, p. 207, paragraph 2-p. 209, paragraph 4.

Jinli Suo et al.: "Design sparse features for age estimation using hierarchical face model", 8th IEEE International Conference on Automatic Face & Gesture Recognition, FG '08, Sep. 17-Sep. 19, 2008, pp. 1-6, XP031448350, IEEE, Piscataway, NJ, USA ISBN: 978-1-4244-2153-4 p. I, left-hand column, paragraph 1.2-p. 4, line 9; figure 4.

Wenyi Zhao and Rama Chellappa (EDs.): "Face Processing; Advanced Modeling and Methods", 2006, Elsevier, Amsterdam, XP002672400, pp. 127-158, p. 144.

International Search Report, dated Apr. 19, 2012, from corresponding PCT application.

* cited by examiner

*Primary Examiner* — Phuoc Tran
(74) *Attorney, Agent, or Firm* — Young & Thompson

(57) ABSTRACT

A method of detecting a predefined set of characteristic points of a face from an image of the face includes a step of making the shape and/or the texture of a hierarchy of statistical models of face parts converge over real data supplied by the image of the face.

17 Claims, 1 Drawing Sheet

METHOD FOR DETECTING A PREDEFINED SET OF CHARACTERISTIC POINTS OF A FACE

Figure 1:
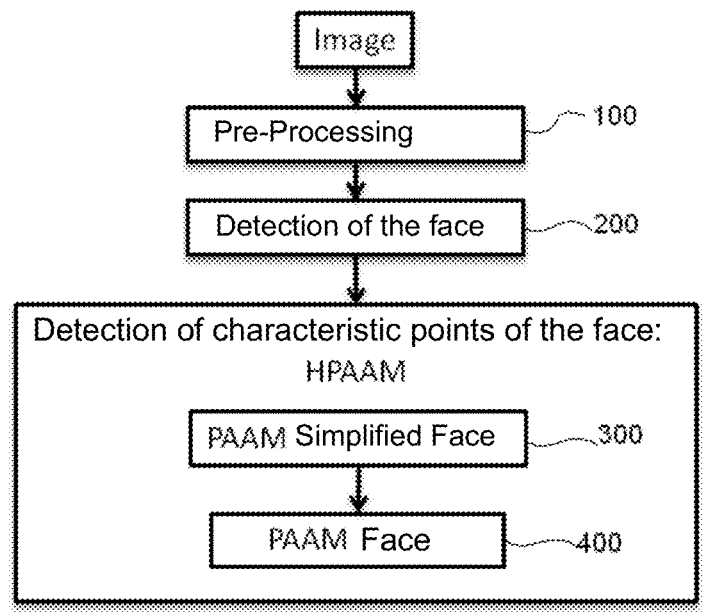

The present invention relates to the area of image processing. It is more particularly about the detection and the monitoring of characteristic points of a face.

CONTEXT OF THE INVENTION AND PROBLEMS POSED

The identification of characteristic points of a face in an image displays numerous applications, which cover particularly safety or augmented reality.

In this latter area, virtual testing of entirely automatic glasses, for example, can be cited, that is to say, the superimposition on a screen of a real image of a user's face, and a virtual image of a pair of glasses of which the characteristic parameters, such as shape and texture, have been previously memorised.

It is thus important to be able to detect the characteristic points of a face from a single image of a user. This method is called alignment of the face.

Amongst the methods of alignment, methods of statistical establishment of a model can be cited. These formally include two phases:
  a learning phase, which consists of creating the statistical model, and
  a detection phase, which consists of making the shape and/or the texture of the model converge over real data.

The three main algorithms using the statistical models are ASMs (Active Shape Models), AAMs (Active Appearance Models) and CLMs (Constrained Local Models).

In the learning phase, the ASMs only model the shape (set of points connected to each other) of an object, the AAMs model the shape and the texture (pixels contained inside the convex cover of the shape), and the CLMs model the shape and the texture patches (pixels contained in a neighbouring area on each point of the shape).

In the detection phase, the ASMs, like the CLMs, make the shape of the object converge in accordance with the response surfaces (which are one-dimensional for the ASMs and two-dimensional for the CLMs), the texture of the CLM statistical model is static or updated through predictions. While for the AAMs, the convergence happens jointly on the texture and the shape (with gradient descent methods), the texture of the model looks to best approximate the texture of the image on which the detection takes place.

The CLMs have the advantage of being more resolute to occultations and changes of appearance, but are more sensitive to local minimums. The AAMs are more resolute opposite local minimums, but the convergence of the texture is problematic in gradient descent methods (a problem of triangulation of the shape of which the function of deforming the network must always create a smooth network), and the AAMs adapt themselves less to the variability of the faces.

These various algorithms, are not therefore totally adequate.

ANALYSIS OF THE INVENTION

The present invention aims for, according to a first aspect, a method of detecting a predefined set of characteristic points of a face from an image of this face.

The method comprises a group of steps 300-400, which consists of making the shape and/or the texture of a hierarchy of statistical models of face parts converge, over real data supplied by the image of the face.

In the literature, this method of detecting or identifying characteristic points is also called face reconstruction, in that it then allows the reconstruction of the three-dimensional shape and the position of the face, and therefore to calculate, if needed, various dimensions, for example, in the framework of testing pairs of virtual glasses.

Preferably, the statistical models used are Patches Active Appearance Models (PAAMs). These are advantageously created from the same learning data (textures and shapes), only the different sub-sets of points defining the shapes being used.

It consists therefore of an algorithm of face reconstruction, named following the Hierarchical Patches Active Appearance Models (HPAAMs) description.

According to a preferred implementation, the method comprises the use of a hierarchy of statistical models of face parts (HPAAMs) for the detection of points characterising simplified faces or face parts (like, for example, the eyes and the mouth) (step 300), then a hierarchy of statistical models of the face for the final detection (step 400).

Preferentially, the group of steps 300-400 uses a modelling alignment method, comprising two phases:
  a learning phase, which consists of creating the statistical model, and
  a detection phase, which consists of making the shape and/or the texture of the model converge over real data.

According to a preferred implementation, the construction of a statistical model of shape and of texture is achieved by aligning and by standardising all the shapes and the textures, then by carrying out a main component analysis on the aligned shapes and on the aligned textures.

The detection method uses, in a particular case, a minimisation step through an inverse compositional algorithm (ICA) for the reconstruction of the face by making the shape p, posture q, and texture λ parameters of each statistical model of face part converge.

In this detection phase using a Gauss Newton type approach via the ICA algorithm, the texture, the shape and the posture of the PAAM model are optimised so that the texture of each one of the patches converges towards the texture of the image used for the detection.

According to an advantageous mode if implementation, the hierarchical model is a set made up of a statistical models of face parts (MSV1), and of a statistical model of the face (MSV2).

According to various implementations possibly used together:
  the method comprises a step 100 of pre-processing of the image, in order to best free it up from the light conditions of the shot, this pre-processing comprising a histogram equalisation.
  the method comprises a step 200 of detection of the face in the image, achieved using a Viola and Jones type algorithm.

PRESENTATION OF THE FIGURES

The characteristics and advantages of the invention will be best appreciated using the description which follows, a description which outlines the characteristics of the invention through an applied non-limiting example.

The description is based on the appended figures which represent:
  FIG. 1: a flow diagram of the method described here
  FIG. 2: an example of a statistical model of the face.

DETAILED DESCRIPTION OF AN EMBODIMENT OF THE INVENTION

In the framework of the example described here, the method according to the invention (illustrated FIG. 1) is intended to be implemented in software form, for example by a known microcomputer of the market.

The method works on the entry data, representative of an image of the face of an individual.

The method and the device for acquiring the image of the face come out as such of the framework of the present invention and are not therefore detailed before here.

Method of Functioning

The algorithm of the face alignment solution proposed comprises four steps:

Step 100: A pre-processing of the image, in order to best free it up from the light conditions of the shot. The pre-processing of the image used is a histogram equalisation.

Step 200: A detection of the face in the image. The face detection is achieved using a known Viola and Jones type algorithm.

Step 300: A detection of face parts (like, for example, the eyes and the mouth) in the area of the face detected at the previous step 200. The detection of face parts consist of making a simplified statistical face model (MSV1) of patches active appearance model type (noted PAAM to simplify) converge.

It should be noted that this step 300 can contain the intermediary sub-steps which are not essential, but which keep the reconstruction (that is to say, the detection of the characteristic points of the face, allowing to reconstitute it under whichever angle) more resolute. That consists of making a statistical model of PAAM type converge in each sub-step, with more and more rich or complex in number of points and/or in size of patches. The last sub-step being the convergence of the most complex simplified statistical model of the face.

The aim of each sub-step is to make a known ICA (inverse compositional algorithm) type algorithm converge on a statistical model before another more complex statistical model.

This ICA algorithm, allows to find in an iterative way, the shape (p), the posture (q) and texture ($\lambda$) parameters which best correspond to the processed image.

Indeed, this allows, particularly to improve the estimation of the posture parameter q, which is quite imprecise, by using the Viola and Jones detection of the face.

It should also be noted that, in a variant of implementation, a more complex initialisation of the PAAM models can be considered. Several instances or initialisations of the PAAM statistical model (of the simplified face MSV1 or of a sub-step) can, for example, be initiated inside the area of the face found at step 200. The detected points of the parts of the face will thus be those given by the best instance in terms of correlation or convergence error.

Figure 2:
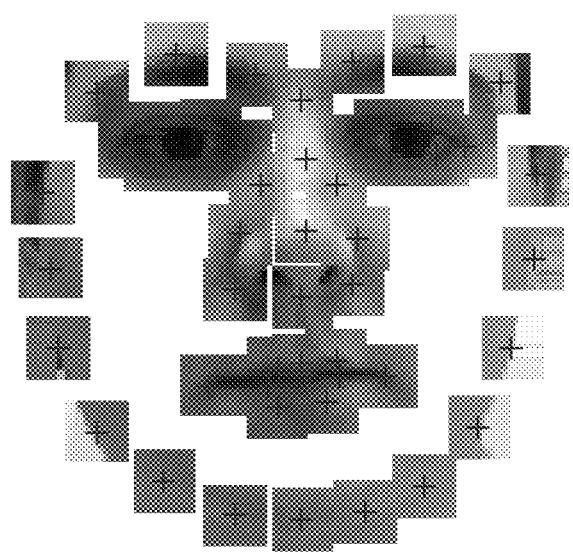

Step 400: A detection of the characteristic point of the face consists of making a PAAM type statistical model of the face (MSV2) converge. FIG. 2 illustrates an example of a statistical model of the face.

The statistical models MSV1 and MSV2 can be created from the same learning base, there are therefore multiplying factors allowing to match the parameters governing the shapes corresponding to the statistical models MSV1 and MSV2. For example, the parameter modifying the shape of a movement from left to right of the face for the statistical model MSV1 is −1 time of that of the statistical model MSV2.

The initialisation of the step 400, can therefore possibly be done, using these multiplicative factors applied to the parameters found at the step 300. The other parameters not finding correspondence can be instantiated in several positions (−0.5, 0 and 0.5 for example), only the convergence giving the smallest error. The tests have shown that is was preferable to consider the error given by the correlation of the texture of the model and the texture of the image (ZNCC) instead of the difference on the edge of these textures (SSD).

The posture (q) parameter is initialised using the step 300.

It should be noted that this step 400 can also contain intermediary sub-steps, which are not essential, but which make the reconstruction more resolute. That consists of making a more and more complex (in terms of size of patches or resolution) PAAM type statistical model of the face converge in each sub-step. The last sub-step being the convergence of the most complex statistical model of the face.

It should also be noted that the parameters of initialisation of the sub-steps can be deduced from the previous sub-step, using the fact that the statistical models of the faces can be created from the same learning base.

Concerning the PAAM statistical models (used in the step 300 and 400), the method of alignment by statistical modelling comprises two phases:
- a learning phase, which consists of creating the statistical model, and
- a detection phase, which consists of making the shape and/or the texture of the model converge over real data.

The learning phase of the PAAM statistical model by Patches Active Appearance Models, proposed in the present example of implementation of the invention, differs from an algorithm of constrained local models (CLMs), on the fact that a texture is now learnt, and in the way of carrying out the alignment of data.

The detection phase of the PAAM model is done in a similar way to the AAMs. A Gauss Newton minimisation is used together on the texture, the shape and the posture of the model, so that the texture of each one of the patches converge towards the texture of the image used for the detection. A very significant difference comes from the way of modifying the shape (the way of implementing deformation functions or 'Warp' functions). Indeed, the convergence methods of the AAMs call on the composition of network deformation functions. But, in the case of networks, the composition in each triangle loses network connectivity. A network being a set of points connected by triangulation.

The advantage of this PAAM approach is that the resolution of the minimisation does not require approximation, due to the deformation functions (or 'Warp'), because there is no longer a notion of network connectivity that can formalise the problem solution in a matrix way.

In a preferred implementation, a hierarchical model face alignment is used in the present method (noted HPAAM simply, following the description), which is the composition of PAAM statistical models, these models being able to be created from the same learning data (textures and shapes).

A hierarchical model is defined as the composition of statistical models, when these statistical models are created from the same learning data (textures and shapes). Only the different sub-sets of points defining the shapes are used.

It is called hierarchical, because of the definition (in number of points), and therefore the semantic content of the implied models will grow progressively.

The construction of a statistical model of shape and of texture is, to itself, achieved by aligning and standardising all the shapes and the textures, then by applying an principal component analysis (noted as PCA in the description) on the aligned shapes and on the aligned textures. The analysis of main component algorithms are well known by experts, and are therefore not detailed here.

The shapes (S) are thus set in the following way: $S=\tilde{S}+\Phi_S b_S$, wherein S is the average shape and $b_S$, the proper vectors given by the analysis of main component. In a similar way, for the textures: $T=\tilde{T}+\Phi_T b_T$ The statistical models shown are, in the present example, created from one hundred textures and face shapes.

A texture is the concatenation of rectangular patches centred on each point of the shape.

The hierarchical model proposed is a set made up of a statistical model of face parts (MSV1) and a statistical model of the face (MSV2).

An alignment of the shapes is thus carried out by a Procrustes analysis, according to a known method.

The shape of the statistical model of the face MSV2 is, in the present example of implementation, made up of fifty-one points. It is however clear that the models using more or less large numbers of points are useable.

Here still, an alignment of the shapes is carried out by a Procrustes analysis, according to a known method. The texture is the concatenation of 51 rectangular patches.

In the face alignment solution shown here, as a non-limiting example, a HPAAM is used for the detection of the face parts (step 300), then a HPAAM for the face for the final detection (step 400).

A PAAM statistical model uses two standardised parameters for estimation: a first parameter p, defining the shape, and a second parameter λ, defining the texture. For the variation in posture of the faces in the image (rotation, homothety, transfer), a third parameter q (posture parameter) is for estimation.

For the HPAAM part of the face parts (step 300), the parameters p and λ of the PAAM MSV1 statistical model are initialised to 0, while the posture parameter q is estimated using the detection of the face.

In the same way, in the case where the intermediary sub-steps are used, the parameters p and λ of the following PAAM statistical models (more complex models) are initialised to 0.

It should be noted that in a non-favoured embodiment (as less resolute), the step 300 of convergence of a PAAM statistical model of a MSV1 simplified face can be removed. In this case, several instances or initialisations of the shape parameter of the step 400 are thus initiated. The points of the face detected will thus be those given by best instance in terms of correlation or error of convergence.

The parameter λ of texture is itself initialised to 0, because the textures of the two stages (corresponding to the two levels of resolution) are not connected. Finally, the posture parameter q can be directly restarted at the previous PAAM stage.

The present invention aims for, according to a second aspect, a method of monitoring a predefined set of characteristic points of a face in a video. Indeed, the face alignment method described previously allows the detection of the characteristic points of a face being found in the first image making up a video. This step particularly allows the finding of the posture, texture and shape parameters, accounting for the face detected. For the following images which make up the video, such a detection is not necessary, as it is always about the same identity, and shape and posture variations between 2 consecutive images are minimal. The monitoring therefore consists of making a PAAM type statistical model of the face (MSV2) converge successively for each image. The parameters simply being initialised using parameters found for the previous image.

For each point linked with the patch, it is possible to establish direct comparisons between the images, and thus to allow the scattered 3D reconstruction of the model of the face, together with its 3D monitoring along the video sequence, according to classic expert beam adjustment techniques.

Advantages of Embodiment

A HPAAM face alignment algorithm allows the detection of characteristic points of a face by freeing up the most possible conditions of shots of images (induced by the acquisition system or by lighting up the scene), and of the variations belonging to the face (identity, posture, expression).

It should be noted that the choice of a deformable model by patch has the advantage of creating less dependence on lighting up, less dependence on face expression, and avoiding the problem of network connectivity in relation to a complete deformable model.

The reconstruction by proposed patch has shown its effectiveness on databases of faces containing a great variation in identities, postures and levels of light.

Variants of Embodiment

The range of the present invention is not limited to details of shapes of embodiment considered above as examples, but on the contrary, extends to modifications accessible to experts.

The invention claimed is:

1. A method of detecting a predefined set of characteristic points of a face from an image of this face, which comprises the step of:
    obtaining the characteristic points by making a shape and/or a texture of a hierarchy of statistical models of face parts converge over real data supplied by the image of the face by using statistical models of the Patches Active Appearance Models (PAAM) type.

2. The method according to claim 1, further comprising the steps of using a hierarchy of statistical models of simplified faces (HPAAM) for the detection of face parts (step 300), then using a hierarchy of statistical models of the face for the final detection (step 400).

3. The method according to claim 1, wherein the steps use a modelling alignment method, comprising two phases:
    a learning phase, which consists of creating the statistical model, and
    a detection phase, which consists of making the shape and/or the texture of the statistical model converge over real data.

4. The method according to the claim 3, wherein the creation of a statistical model of shape and of texture is achieved by aligning and by standardizing all the shapes and the textures, then by applying an analysis of main component on the aligned shapes and on the aligned textures.

5. The method according to claim 2, wherein the statistical models are created from the same learning data (textures and shapes), only from different sub-sets of points defining the shapes being used.

6. The method according to claim 1, further comprising a step of minimization by an inverse compositional algorithm (ICA) for the detection of characteristic points of the face by making the parameters of shape p, of posture q and of texture λ of each statistical model of face part converge.

7. The method according to claim 3, wherein in the detection phase of the PAAM model, a Gauss Newton minimization is used, together on the texture, the shape and the posture of the model, so that each one of the patches converge towards the texture of the images used for the detection.

8. The method according to claim 1, wherein the hierarchical model is a set made up of a statistical model of a simplified face (MSV1), and a statistical model of the face (MSV2).

9. The method according to claim 1, further comprising a step (100) of pre-processing the image, in order to best free up lighting conditions of the shot, this pre-processing comprising a histogram equalization.

10. The method according to claim 1, further comprising a step (200) of detecting the face in the image, achieved using a Viola and Jones type algorithm.

11. The method according to claim 2, wherein the steps use a modelling alignment method, comprising two phases:
- a learning phase, which consists of creating the statistical model, and
- a detection phase, which consists of making the shape and/or the texture of the statistical model converge over real data.

12. The method according to claim 4, wherein in the detection phase of the PAAM model, a Gauss Newton minimization is used, together on the texture, the shape and the posture of the model, so that each one of the patches converge towards the texture of the images used for the detection.

13. The method according to claim 5, wherein in the detection phase of the PAAM model, a Gauss Newton minimization is used, together on the texture, the shape and the posture of the model, so that each one of the patches converge towards the texture of the images used for the detection.

14. A method according to claim 1, wherein the obtaining step obtains the characteristic points by making the shape of the hierarchy of statistical models of face parts converge over real data supplied by the image of the face by using statistical models of the Patches Active Appearance Models (PAAM) type using a plurality of detected rectangular patches of the image of the face.

15. A method according to claim 1, wherein the obtaining step obtains the characteristic points by making the texture of the hierarchy of statistical models of face parts converge over real data supplied by the image of the face by using statistical models of the Patches Active Appearance Models (PAAM) type, and the texture is a concatenation of a plurality of detected rectangular patches of the image of the face.

16. A method according to claim 1, wherein the obtaining step obtains the characteristic points by making the shape and the texture of the hierarchy of statistical models of face parts converge over real data supplied by the image of the face by using statistical models of the Patches Active Appearance Models (PAAM) type using a concatenation of a plurality of detected rectangular patches of the image of the face.

17. A method of monitoring a predefined set of characteristic points of a face in a video,
which comprises detecting characteristic points of the face for a first image making up the video; and making a shape and/or texture of a statistical model of face parts converge over real data supplied by subsequent images making up the video, the statistical model used being a Patches Active Appearance Model (PAAM) type.

\* \* \* \* \*